(12) United States Patent
Atsuchi et al.

(10) Patent No.: US 10,429,497 B2
(45) Date of Patent: Oct. 1, 2019

(54) ULTRASONIC DEVICE, ULTRASONIC PROBE, ELECTRONIC APPARATUS, AND ULTRASONIC IMAGING APPARATUS

(71) Applicant: Seiko Epson Corporation, Tokyo (JP)

(72) Inventors: Robina Atsuchi, Fujimi (JP); Daisuke Nakanishi, Matsumoto (JP)

(73) Assignee: Seiko Epson Corporation (JP)

( * ) Notice: Subject to any disclaimer, the term of this patent is extended or adjusted under 35 U.S.C. 154(b) by 511 days.

(21) Appl. No.: 15/336,087

(22) Filed: Oct. 27, 2016

(65) Prior Publication Data

US 2017/0123056 A1   May 4, 2017

(30) Foreign Application Priority Data

Oct. 29, 2015  (JP) ................. 2015-212631

(51) Int. Cl.
| | |
|---|---|
| *G01S 7/52* | (2006.01) |
| *G01S 15/89* | (2006.01) |
| *G10K 11/00* | (2006.01) |
| *G10K 11/30* | (2006.01) |
| *B06B 1/06* | (2006.01) |

(52) U.S. Cl.
CPC ...... *G01S 7/52079* (2013.01); *G01S 7/52053* (2013.01); *G01S 15/8911* (2013.01); *G01S 15/8915* (2013.01); *G10K 11/002* (2013.01); *G10K 11/30* (2013.01); *B06B 1/0622* (2013.01); *G01S 7/52077* (2013.01)

(58) Field of Classification Search
CPC ............ G01S 7/52079; G01S 15/8915; G01S 7/52053; G01S 15/8911; G01S 7/52077; G10K 11/30; G10K 11/002; B06B 1/0622
See application file for complete search history.

(56) References Cited

U.S. PATENT DOCUMENTS

| | | |
|---|---|---|
| 5,762,616 A | 6/1998 | Talish |
| 2010/0140013 A1 | 6/2010 | Boock |
| 2014/0276087 A1 | 9/2014 | Corl |

(Continued)

FOREIGN PATENT DOCUMENTS

| | | | | |
|---|---|---|---|---|
| CN | 106963416 A | * | 7/2017 | |
| JP | 2007-134767 A | | 5/2007 | |
| JP | 2017080132 A | * | 5/2017 | ......... G01S 15/8915 |

OTHER PUBLICATIONS

U.S. Appl. No. 15/335,986, filed Oct. 27, 2016. Robina Atsuchi.

*Primary Examiner* — Daniel Pihulic
(74) *Attorney, Agent, or Firm* — Harness, Dickey & Pierce, P.L.C.

(57) ABSTRACT

An ultrasonic device that transmits and receives ultrasonic waves includes: ultrasonic elements having first and second surfaces from which the ultrasonic waves are emitted; and a backing unit that supports the second surfaces of the ultrasonic elements and attenuates the ultrasonic waves emitted to the second surface side. The backing unit includes microlenses, which are arranged on the second surface side of the ultrasonic elements so as to be located corresponding to the ultrasonic elements, and a backing member having slits through which the ultrasonic waves transmitted through the microlenses pass. The ultrasonic elements are arranged in the shape of an array, and the microlenses are arranged in the shape of an array corresponding to the ultrasonic elements.

20 Claims, 6 Drawing Sheets

(56) References Cited

U.S. PATENT DOCUMENTS

2015/0190116 A1  7/2015  Song
2017/0119346 A1* 5/2017  Atsuchi ................ A61B 8/4444
2017/0123056 A1* 5/2017  Atsuchi ............... G01S 15/8915

* cited by examiner

ULTRASONIC DEVICE, ULTRASONIC PROBE, ELECTRONIC APPARATUS, AND ULTRASONIC IMAGING APPARATUS

This application claims the benefit of Japanese Patent Application No. 2015-212631, filed on Oct. 29, 2015. The content of the aforementioned application is hereby incorporated by reference in its entirety.

BACKGROUND

1. Technical Field

The present invention relates to an ultrasonic device, an ultrasonic probe including an ultrasonic device, and an electronic apparatus including an ultrasonic probe, and an ultrasonic imaging apparatus including an ultrasonic probe.

2. Related Art

A known ultrasonic device is configured to include a piezoelectric member, a backing unit, an acoustic matching layer, an acoustic lens, and the like. Ultrasonic waves generated by the piezoelectric member of the ultrasonic device are incident on a subject through the acoustic matching layer and the acoustic lens. Then, the ultrasonic device receives reflected waves (ultrasonic waves) that are reflected from the inside of the subject, and generates a voltage corresponding to the strength of the reflected waves. In addition, the backing unit supports the piezoelectric member and attenuates unwanted ultrasonic waves, thereby suppressing noise riding on the ultrasonic wave incident on the subject.

In a case where the piezoelectric member (ultrasonic element) is formed in a thin-film structure in which a piezoelectric layer is arranged in the shape of an array on a vibrating film on a silicon substrate, a metal plate is used as a backing member that forms the backing unit in order to secure the structural strength including the rigid force of suppressing deflection of the ultrasonic element array. In addition, since the backing member uses a characteristic that the attenuation of ultrasonic waves increases as the travel distance increases (thickness increases), a metal plate having a thickness equal to or greater than the rigid force is used.

JP-A-2007-134767 discloses an ultrasonic probe configured to include piezoelectric transducers arranged on a backing material. In the ultrasonic probe disclosed in JP-A-2007-134767, a backing material is formed of a composite material containing a fiber material and a resin, and the longitudinal direction of the fiber material matches a vibration direction of each piezoelectric transducer. JP-A-2007-134767 discloses that lightness and broadband frequency characteristics are realized to obtain a high-quality image by using such an ultrasonic probe. In addition, in the ultrasonic probe disclosed in JP-A-2007-134767, the piezoelectric transducer is of a so-called bulk type. Accordingly, as a backing material, for example, by dispersing tungsten powder slightly in a composite material containing an epoxy resin and carbon fiber, lightness is realized.

Currently, in order to improve the convenience of the ultrasonic probe or the ultrasonic imaging apparatus, it has been requested to make an ultrasonic device thin using a thin-film ultrasonic element (ultrasonic element array). Specifically, it has been requested to make a backing unit thin. In the case of simply reducing the thickness of the backing member in the related art, it is a problem that unwanted ultrasonic waves, which have not been attenuated by the backing member, are emitted to the ultrasonic element side to become a large noise component. In addition, since the noise component is displayed as artifacts in the Y-axis direction (depth direction) during B-mode imaging, the noise component is the cause of false findings in an examination or the like.

Therefore, an ultrasonic device including a backing unit that can suppress unwanted ultrasonic waves and can be made thin, an ultrasonic probe including the ultrasonic device, an electronic apparatus including the ultrasonic probe, and an ultrasonic imaging apparatus including the ultrasonic probe have been demanded.

SUMMARY

An advantage of some aspects of the invention is to solve at least a part of the problems described above, and the invention can be implemented as the following aspects or application examples.

Application Example 1

An ultrasonic device according to this application example transmits and receives ultrasonic waves. The ultrasonic device includes: ultrasonic elements having first and second surfaces from which the ultrasonic waves are emitted; and a backing unit that supports the second surfaces of the ultrasonic elements and attenuates the ultrasonic waves emitted to the second surface side. The backing unit includes microlenses, which are arranged on the second surface side of the ultrasonic elements so as to be located corresponding to the ultrasonic elements, and a backing member having slits through which the ultrasonic waves transmitted through the microlenses pass.

According to such an ultrasonic device, the backing unit that supports the second surface of each ultrasonic element includes the microlenses and the backing member. The microlenses are arranged on the second surface side of the ultrasonic elements so as to be located corresponding to the ultrasonic elements. The backing member has slits through which the ultrasonic waves transmitted through the microlenses pass. Accordingly, in a case where ultrasonic waves emitted from the second surface side of the ultrasonic element are incident on the microlens of the backing unit, the ultrasonic waves are emitted in a state of being focused after being transmitted through the microlenses. The ultrasonic waves that are emitted from the microlens to be focused are transmitted through the slit of the backing member. Then, the ultrasonic waves transmitted through the slit travel up to the end surface of the backing unit. Here, for example, in a case where the end surface of the backing unit is in contact with an air layer, ultrasonic waves are reflected on the end surface of the backing unit to return in a direction (direction of the slit) opposite to the traveling direction until now. However, in a case where the ultrasonic waves are reflected to return in the opposite direction, the ultrasonic waves are diffused. Therefore, the ultrasonic waves passing through the slit again are attenuated. Through the operation described above, it is possible to suppress ultrasonic waves (so-called unwanted ultrasonic waves) returning to the ultrasonic element from the backing unit. Thus, it is possible to prevent the ultrasonic wave emitted from the second surface side from riding, as noise, on the ultrasonic wave emitted from the first surface side. In addition, compared with the thickness of a backing unit (backing member) in the related art, the backing unit (backing member) can be made thin up to the minimum thickness at which the structural strength of the ultrasonic element including the microlens and the slit, through which the ultrasonic waves emitted from the microlens pass, can be secured. As a result, it is possible to realize the ultrasonic device that can suppress unwanted ultrasonic waves and can be made thin.

Application Example 2

In the ultrasonic device according to the application example, it is preferable that the ultrasonic elements are arranged in a shape of an array and the microlenses are arranged in a shape of an array corresponding to the ultrasonic elements.

According to such an ultrasonic device, even in a case where the ultrasonic elements are arranged in the shape of an array and the microlenses are arranged in the shape of an array corresponding to the ultrasonic elements, it is possible to attenuate ultrasonic waves, which are reflected on the end surface of the backing unit to pass through the slit again, by making ultrasonic waves converge on each of the microlenses and passing through the corresponding slit. Therefore, it is possible to suppress unwanted ultrasonic waves. In addition, compared with the thickness of a backing unit (backing member) in the related art, the backing unit (backing member) can be made thin up to the minimum thickness at which the structural strength for preventing the deflection of the ultrasonic elements (ultrasonic element array) arranged in the shape of an array, including the microlenses arranged in the shape of an array, and the slit, through which the ultrasonic waves emitted from the microlens pass, can be secured. As a result, it is possible to realize the ultrasonic device that can suppress unwanted ultrasonic waves and can be made thin.

Application Example 3

In the ultrasonic device according to the application example, it is preferable that the slits are arranged at distances equal to an arrangement distance between the microlenses arranged in the shape of an array.

According to such an ultrasonic device, ultrasonic waves emitted from the ultrasonic elements can be made to be efficiently incident on the corresponding slits by arranging the slits at distances equal to the arrangement distance between the microlenses arranged in the shape of an array. Therefore, since it is possible to efficiently arrange the slits, it is possible to further suppress unwanted ultrasonic waves returning to the ultrasonic element from the backing unit. As a result, the backing unit can be made thin.

Application Example 4

In the ultrasonic device according to the application example, it is preferable that the microlenses and the backing member are coated with a coating material.

According to such an ultrasonic device, it is possible to prevent the generation of an air layer between the ultrasonic element and the backing unit. For example, in a case where a resin is used as a coating material, it is possible to approximately match the acoustic impedance of the coating material with the acoustic impedance of the ultrasonic element. Therefore, ultrasonic waves emitted from the ultrasonic element can be made to be efficiently incident on the backing unit while suppressing reflection on the boundary surface of the backing unit. In addition, since it is possible to prevent the generation of an air layer inside the backing unit, the ultrasonic waves emitted from the microlens can be efficiently transmitted through the slits of the backing member. Accordingly, it is possible to suppress unwanted ultrasonic waves returning to the ultrasonic element from the backing unit.

Application Example 5

In the ultrasonic device according to the application example, it is preferable that the backing unit includes a sound absorbing section that absorbs the ultrasonic waves transmitted through the backing member.

According to such an ultrasonic device, since the sound absorbing section that absorbs the ultrasonic waves transmitted through the backing member is provided, it is possible to further suppress unwanted ultrasonic waves returning to the ultrasonic element from the backing unit.

Application Example 6

An ultrasonic probe according to this application example includes: the ultrasonic device according to any one of the application examples; and a housing member that houses the ultrasonic device such that apart of the ultrasonic device is exposed.

According to such an ultrasonic probe, since the ultrasonic probe is configured such that a thin ultrasonic device is housed in the housing member, it is possible to make the ultrasonic probe thin. In addition, since the ultrasonic device for suppressing unwanted ultrasonic waves is housed, it is possible to prevent unwanted ultrasonic waves from riding as noise on the ultrasonic waves emitted toward the subject from the ultrasonic device. Therefore, it is possible to improve the quality of the ultrasonic probe.

Application Example 7

An electronic apparatus according to this application example includes: the ultrasonic probe according to the application example; and a processing device that controls the ultrasonic probe and processes an input signal from the ultrasonic probe.

According to such an electronic apparatus, it is possible to improve the convenience and quality of the electronic apparatus by using the ultrasonic probe, which is made thin and has improved quality, and the processing device.

Application Example 8

An ultrasonic imaging apparatus according to this application example includes: the ultrasonic probe according to the application example; a processing device that controls the ultrasonic probe and generates an image by processing an input signal from the ultrasonic probe; and a display device that displays the image generated by the processing device.

According to such an ultrasonic imaging apparatus, it is possible to improve the convenience of the ultrasonic imaging apparatus by using the thin ultrasonic probe, the processing device, and the display device. In addition, since the ultrasonic probe (ultrasonic device) that suppresses unwanted ultrasonic waves is provided, the ultrasonic imaging apparatus can suppress the occurrence of artifacts during B-mode imaging. Therefore, it is possible to reduce false findings in an examination or the like. As a result, it is possible to improve the quality of the ultrasonic imaging apparatus.

BRIEF DESCRIPTION OF THE DRAWINGS

The invention will be described with reference to the accompanying drawings, wherein like numbers reference like elements.

DESCRIPTION OF EXEMPLARY EMBODIMENTS

In the present embodiment, an ultrasonic device 1, an ultrasonic probe 100 including the ultrasonic device 1, and an ultrasonic imaging apparatus 110 as an electronic apparatus including the ultrasonic probe 100 will be described with reference to the accompanying diagrams. In each diagram, the scale of each member is adjusted in order to have a recognizable size.

First Embodiment

Figure 1:
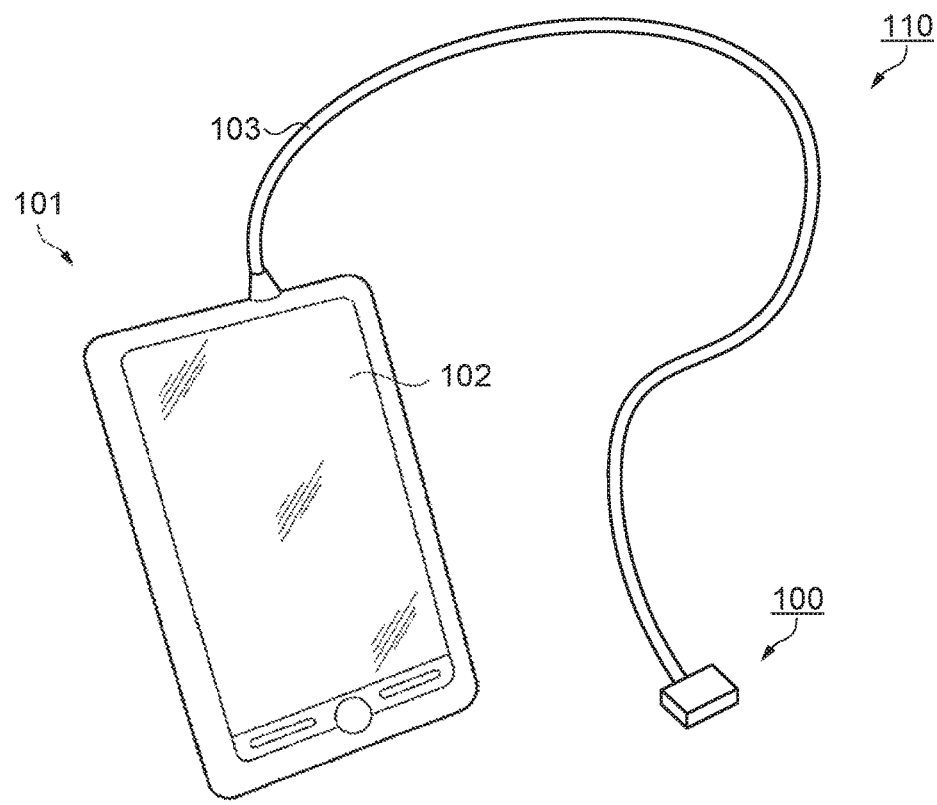
FIG. 1 is a perspective view showing the schematic configuration of an ultrasonic imaging apparatus according to a first embodiment.

FIG. 1 is a perspective view showing the schematic configuration of the ultrasonic imaging apparatus 110 according to the first embodiment. The configuration of the ultrasonic imaging apparatus 110 will be described with reference to FIG. 1.

The ultrasonic imaging apparatus 110 of the present embodiment is an apparatus that holds the ultrasonic probe 100 on the skin surface of a subject or the like so as to be in close contact with each other, transmits ultrasonic waves from the ultrasonic probe 100, receives reflected waves (ultrasonic waves) that are reflected from the inside of the subject, analyzes data of the received ultrasonic waves, and displays the data as an image. An operator performs an insertion operation or the like while checking the image.

The ultrasonic imaging apparatus 110 as an electronic apparatus includes the ultrasonic probe 100, a processing device 101, and a display device 102. The ultrasonic probe 100 and the processing device 101 are connected to each other through a flexible cable 103, so that an electrical signal is transmitted or received therebetween. The processing device 101 includes the display device 102, and displays an image generated by the processing of the processing device 101 (image based on ultrasonic waves detected by the ultrasonic probe 100).

Figure 2:
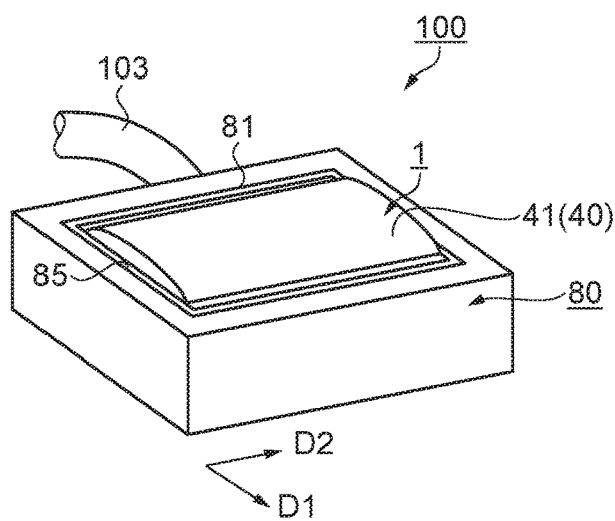
FIG. 2 is a perspective view showing the schematic configuration of an ultrasonic probe.
Figure 3:
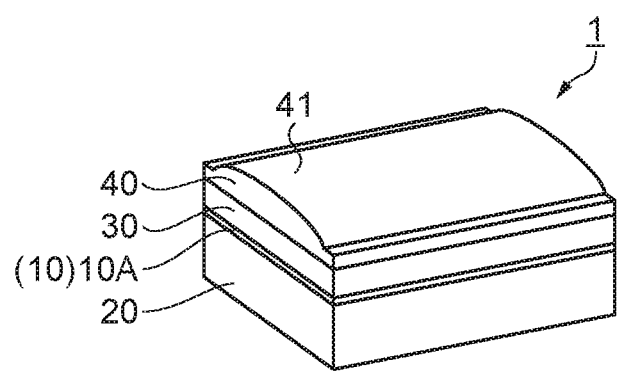
FIG. 3 is a perspective view showing the schematic configuration of an ultrasonic device.

FIG. 2 is a perspective view showing the schematic configuration of the ultrasonic probe 100. Specifically, FIG. 2 is a perspective view when the ultrasonic probe 100 is viewed from a side on which the ultrasonic probe 100 is in close contact with the skin surface. FIG. 3 is a perspective view showing the schematic configuration of the ultrasonic device 1. The configurations of the ultrasonic probe 100 and the ultrasonic device 1 will be described with reference to FIGS. 2 and 3.

As shown in FIG. 2, the ultrasonic probe 100 of the present embodiment is configured to include the ultrasonic device 1, a housing member 80, and the like. The ultrasonic device 1 is generally formed in the shape of a rectangular flat plate, as shown in FIG. 3. Similar to the ultrasonic device 1, the housing member 80 is also formed in the shape of a rectangular flat plate. The housing member 80 has a housing unit 81, and houses the ultrasonic device 1 therein in a state in which an acoustic lens 40 (lens unit 41), which is a part of the ultrasonic device 1, is exposed. When housing the ultrasonic device 1 in the housing unit 81, a gap between the housing unit 81 and the ultrasonic device 1 is sealed by inserting a silicone-based sealing member 85 to a gap between the inner surface of the housing unit 81 and the outer surface of the ultrasonic device 1. The housing member 80 is formed using a synthetic resin member in the present embodiment. However, other members, for example, a metal member can be used without being limited thereto.

As shown in FIG. 3, the ultrasonic device 1 of the present embodiment is configured to include an acoustic matching layer 30, the acoustic lens 40, and a backing unit 20 that are provided above and below an ultrasonic element array 10A (ultrasonic element 10) formed in a rectangular shape. Ultrasonic waves generated by the ultrasonic element 10 of the ultrasonic device 1 are incident on a subject through the acoustic matching layer 30 and the acoustic lens 40. Then, the ultrasonic device 1 receives reflected waves (echo waves) that are reflected from the inside of the subject, and generates a voltage corresponding to the strength of the echoes.

The acoustic matching layer 30 performs acoustic matching for making ultrasonic waves incident on the inside of the subject efficiently by suppressing the reflection of the ultrasonic waves by reducing the difference in acoustic impedance between the ultrasonic element array 10A and the subject. The acoustic lens 40 has an outer surface that is convex in a thickness direction, as shown in FIGS. 2 and 3. Thus, the acoustic lens 40 includes the lens unit 41 that is formed in a partially cylindrical shape. The curvature of the lens unit 41 is set according to the focal position of ultrasonic waves. The acoustic lens 40 improves the resolution by converging the spread of ultrasonic waves emitted from the ultrasonic element array 10A using the lens unit 41. In addition, the backing unit 20 improves the distance resolution in an image by attenuating unwanted ultrasonic waves emitted from the ultrasonic element array 10A.

As shown in FIG. 2, a scan direction D2 is defined as a direction parallel to the generatrix of the acoustic lens 40, and a slice direction D1 is defined as a direction that is perpendicular to the generatrix of the acoustic lens 40 and is parallel to the surface of the housing member 80 in which the housing unit 81 is formed. The scan direction D2 and the slice direction D1 are perpendicular to each other within this plane.

Figure 4:
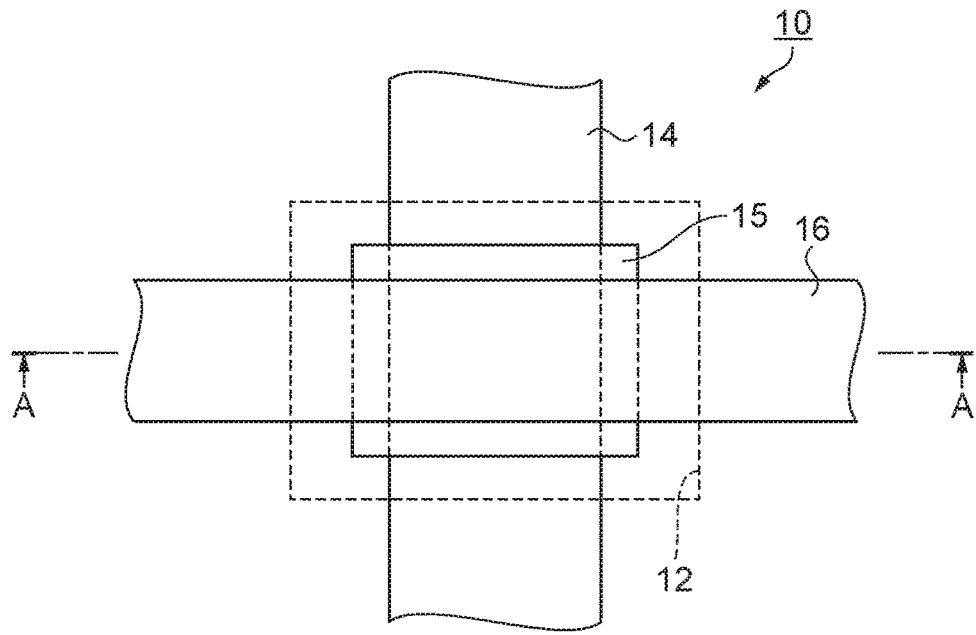
FIG. 4 is a plan view showing the schematic configuration of an ultrasonic element.
Figure 5:
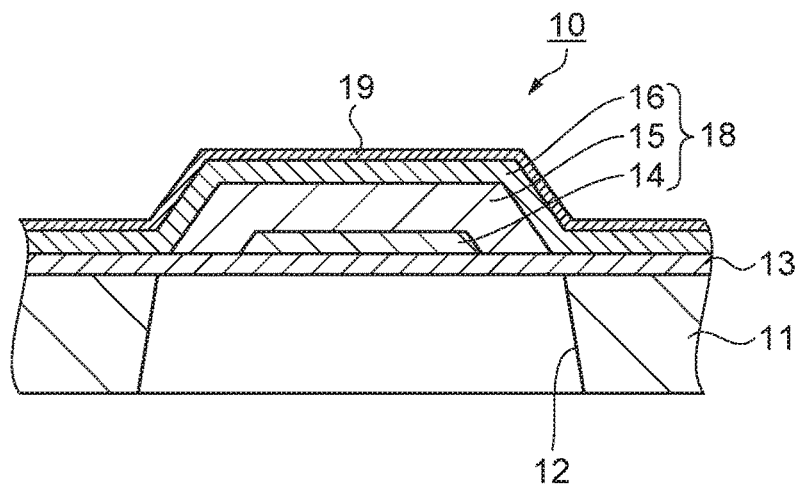
FIG. 5 is a sectional view showing the schematic configuration of an ultrasonic element.
Figure 6:
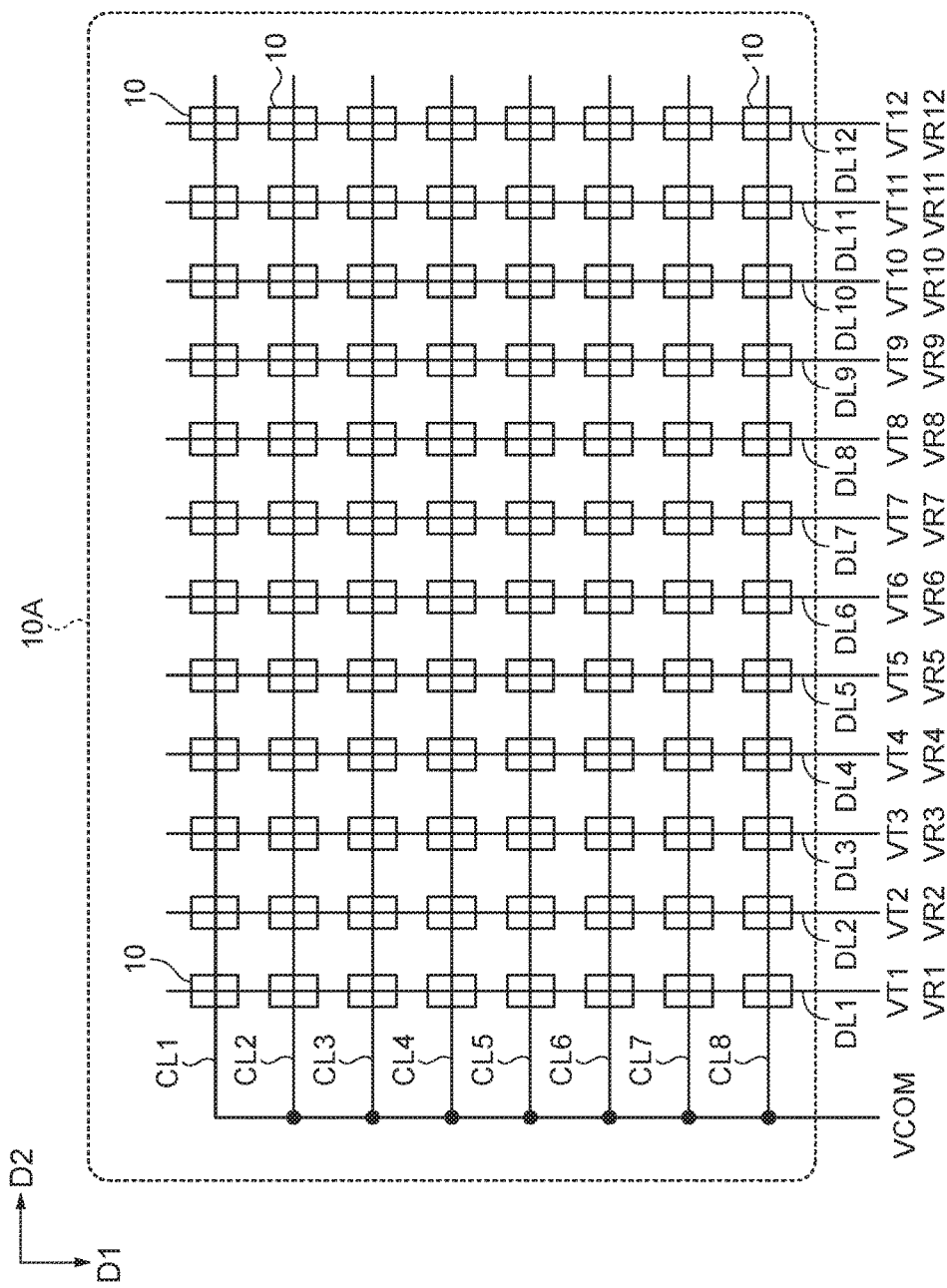
FIG. 6 is an explanatory view showing the schematic configuration of an ultrasonic element array.

FIG. 4 is a plan view showing the schematic configuration of the ultrasonic element 10. FIG. 5 is a sectional view showing the schematic configuration of the ultrasonic element 10. FIG. 5 is a sectional view taken along the line A-A of FIG. 4. FIG. 6 is an explanatory view showing the schematic configuration of the ultrasonic element array 10A. The configurations of the ultrasonic element 10 and the ultrasonic element array 10A of the present embodiment will be described with reference to FIGS. 4 to 6. The ultrasonic element 10 of the present embodiment is a thin-film piezoelectric element.

As shown in FIGS. 4 and 5, the ultrasonic element 10 includes a base substrate 11, a vibrating film 13 formed on the base substrate 11, and a piezoelectric portion 18 provided on the vibrating film 13. The piezoelectric portion 18 includes a first electrode 14, a piezoelectric layer 15, and a second electrode 16.

In the ultrasonic element 10, an opening 12 is provided in the base substrate 11 formed of silicon or the like, and the vibrating film 13 is provided so as to cover and seal the opening 12. The opening 12 is formed by etching, such as reactive ion etching (RIE), from the back surface (surface on which no element is formed) side of the base substrate 11. For example, the vibrating film 13 is formed as a two-layer structure including a silicon oxide ($SiO_2$) layer and a zirconium oxide ($ZrO_2$) layer. Here, in a case where the base substrate 11 is a silicon substrate, the silicon oxide layer can be formed by performing thermal oxidation processing on the substrate surface. The zirconium oxide layer is formed on the silicon oxide layer using a sputtering method, for example. Here, in the case of using, for example, lead zirconate titanate (PZT) as the piezoelectric layer 15 to be described later, the zirconium oxide layer is a layer for preventing the lead forming the PZT from diffusing into the silicon oxide layer. The zirconium oxide layer also has an effect of improving the deflection efficiency against the distortion of the piezoelectric layer 15.

The first electrode 14 is formed on the upper surface of the vibrating film 13, the piezoelectric layer 15 is formed on the upper surface of the first electrode 14, and the second electrode 16 is formed on the upper surface of the piezoelectric layer 15. In other words, the piezoelectric portion 18 is formed in a structure in which the piezoelectric layer 15 is interposed between the first electrode 14 and the second electrode 16.

In a case where the first electrode 14 is formed using a metal thin film and includes a plurality of ultrasonic elements 10 (piezoelectric layer 15), the first electrode 14 may be a wiring line that extends to the outside of the element forming region to be connected to the ultrasonic element 10 (piezoelectric layer 15), as shown in FIG. 4.

The piezoelectric layer 15 is formed using, for example, a lead zirconate titanate (PZT) thin film, and is provided so as to cover at least a part of the first electrode 14. The material of the piezoelectric layer 15 is not limited to the PZT. For example, lead titanate ($PbTiO_3$), lead zirconate ($PbZrO_3$), lead lanthanum titanate (($Pb, La)TiO_3$) may be used.

The second electrode 16 is formed using a metal thin film, and is provided so as to cover at least a part of the piezoelectric layer 15. In a case where the second electrode includes a plurality of ultrasonic elements 10 (piezoelectric layer 15), the second electrode 16 may be a wiring line that extends to the outside of the element forming region to be connected to the adjacent ultrasonic element 10 (piezoelectric layer 15), as shown in FIG. 4.

In addition, as shown in FIG. 5, a moisture-proof layer 19 that covers the ultrasonic element 10 in order to block moisture from the outside is provided. This moisture-proof layer 19 is formed of a material, such as alumina, and is provided on the entire surface of the ultrasonic element 10 or on a part thereof. The moisture-proof layer 19 may be appropriately set depending on the conditions or environment of use, or the moisture-proof layer 19 may not be provided.

The piezoelectric layer 15 expands and contracts in the in-plane direction when a voltage is applied between the first electrode 14 and the second electrode 16. Therefore, when a voltage is applied to the piezoelectric layer 15, for example, bending that causes to become convex on the opening 12 side occurs to deflect the vibrating film 13. By applying an AC voltage to the piezoelectric layer 15, the vibrating film 13 vibrates in a thickness direction, and ultrasonic waves are emitted from the opening 12 by the vibration of the vibrating film 13. In addition, ultrasonic waves are emitted to the opposite side (element formation side) to the opening 12. In addition, the ultrasonic device 1 of the present embodiment emits the ultrasonic waves, which are emitted to the opposite side (element formation side) to the opening 12, to the subject. The voltage (driving voltage) applied to the piezoelectric layer 15 is, for example, 10 to 30 V (peak-to-peak value). The frequency is, for example, 1 to 10 MHz.

The ultrasonic element 10 also operates as a reception element that receives echo waves, which return due to reflection on the object, of the emitted ultrasonic waves. The vibrating film 13 is vibrated by echo waves. Due to this vibration, stress is applied to the piezoelectric layer 15 to generate a voltage between the first electrode 14 and the second electrode 16. This voltage can be taken out as a reception signal.

Next, the ultrasonic element array 10A in which the ultrasonic elements 10 described above are arranged in the shape of an array will be described with reference to FIG. 6.

The ultrasonic element array 10A includes a plurality of ultrasonic elements 10 arranged in the shape of an array, a driving electrode line DL, and a common electrode line CL. A plurality of ultrasonic elements 10 are arranged in a matrix of m rows and n columns. In FIG. 6, as an example, eight rows of ultrasonic elements are arranged in the slice direction D1, and twelve columns of ultrasonic elements are arranged in the scan direction D2.

Each of driving electrode lines DL1 to DL12 is wired along the slice direction D1. During a transmission period for which ultrasonic waves are transmitted, transmission signals VT1 to VT12 output from a processing circuit (not shown) forming the processing device 101 are supplied to the ultrasonic elements 10 through the driving electrode lines DL1 to DL12. In addition, during a reception period for which echo signals of the ultrasonic waves are received, reception signals VR1 to VR12 from the ultrasonic elements 10 are output to the processing circuit through the driving electrode lines DL1 to DL12.

Each of common electrode lines CL1 to CL8 is wired along the scan direction D2. A common voltage VCOM is supplied to the common electrode lines CL1 to CL8. The common voltage VCOM may be a fixed DC voltage, and may not be 0 V, that is, a ground potential.

During the transmission period, a voltage corresponding to the difference between the transmission signal voltage and the common voltage is applied to each ultrasonic element 10, and an ultrasonic wave having a predetermined frequency is emitted. The arrangement of the ultrasonic elements 10 is not limited to the matrix arrangement of eight rows and twelve columns shown in FIG. 6.

Figure 7:
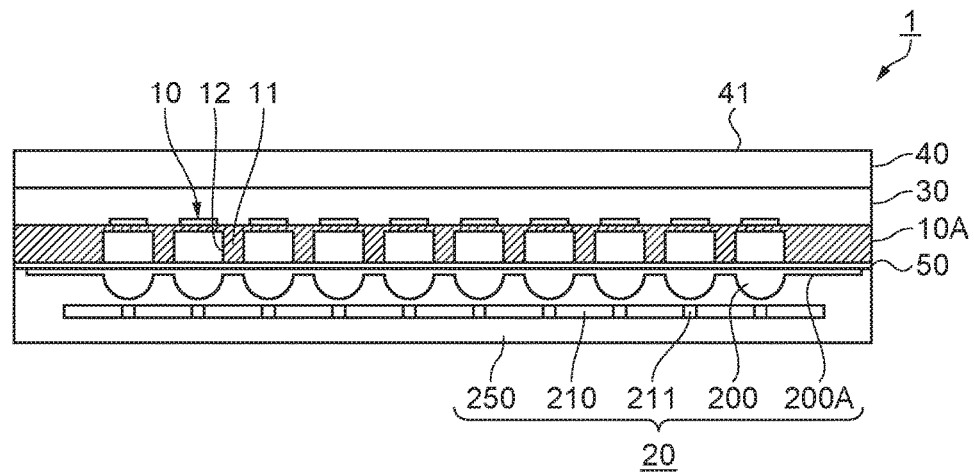
FIG. 7 is a sectional view showing the configuration of an ultrasonic device.
Figure 8:
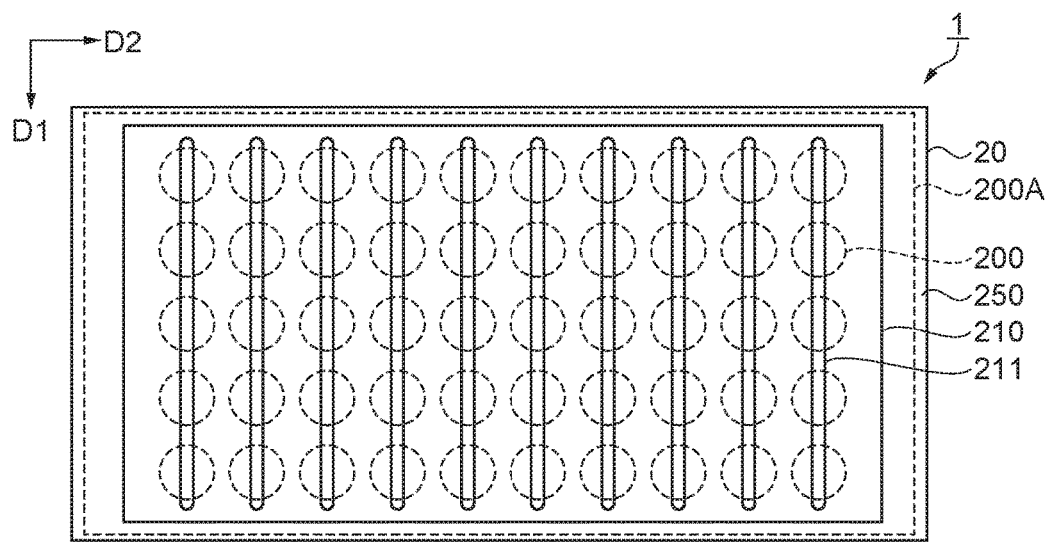
FIG. 8 is a plan view when the ultrasonic device is viewed from a backing unit side.

FIG. 7 is a sectional view showing the configuration of the ultrasonic device 1. Specifically, FIG. 7 is a sectional view when the ultrasonic device 1 is cut in the scan direction D2. FIG. 8 is a plan view when the ultrasonic device 1 is viewed from the backing unit 20 side. In FIG. 8, a backing member 210 coated with a coating material 250 is shown in solid lines for convenience of explanation. In addition, the number of ultrasonic elements 10 in the scan direction D2 is 10 for convenience of explanation. The configuration of the ultrasonic device 1 will be described with reference to FIGS. 3, 7, and 8.

As described above, the ultrasonic device 1 is configured to include the acoustic matching layer 30, the acoustic lens 40, and the backing unit 20 that are provided above and below the ultrasonic element array 10A (ultrasonic element 10) formed in a rectangular shape. In the present embodiment, the acoustic matching layer 30 is formed on the element forming surface (first surface) of the ultrasonic element array 10A, and the acoustic lens 40 is formed on the acoustic matching layer 30. The backing unit 20 that supports the ultrasonic element array 10A is formed on a surface (second surface) opposite the element forming surface of the ultrasonic element array 10A.

The acoustic lens 40 is formed of a resin, such as a silicone resin. As shown in FIG. 3, the lens unit 41 of the acoustic lens 40 is provided so as to cover a range corresponding to the ultrasonic element 10 that forms the ultrasonic element array 10A.

The acoustic matching layer 30 is formed between the ultrasonic element array 10A and the acoustic lens 40. As the acoustic matching layer 30, silicone-based adhesive is used. The adhesive is cured to fix (bond) the ultrasonic element array 10A and the acoustic lens 40. The cured adhesive (resin) functions as the acoustic matching layer 30. The acoustic matching layer 30 reduces mismatching of acoustic impedance between the ultrasonic element 10 and the acoustic lens 40.

In the ultrasonic element array 10A, a silicone resin is filled into the opening 12 formed in the base substrate 11, and is then cured. Accordingly, the ultrasonic element array 10A is in a state in which the opening 12 is filled with the silicone resin. As a result, in a case where the ultrasonic element array 10A is bonded to the backing unit 20 to be described later, the generation of an air layer in the opening 12 is prevented.

The backing unit 20 is configured to include a microlens array 200A and the backing member 210. The microlens array 200A and the backing member 210 are coated with the coating material 250.

The microlens array 200A functions as a lens for performing acoustic matching. The microlens array 200A is formed in a rectangular outer shape. The microlens array 200A is formed by arranging convex lenses (microlenses 200) in the shape of an array. Each microlens 200 is disposed at a position corresponding to each ultrasonic element 10 of the ultrasonic element array 10A. The microlens array 200A (microlens 200) is formed of silicone resin having an acoustic impedance close to that of the ultrasonic element 10. In the present embodiment, the acoustic impedance of the ultrasonic element 10 is about 1 MRayl.

In the present embodiment, the backing member 210 is a stainless member that is a plate-shaped metal member having a rectangular outer shape. As the backing member 210, a metal member or a ceramic member other than the stainless member may be used.

The backing member 210 has a slit 211 passing therethrough in the thickness direction. In the present embodiment, the slit 211 is formed corresponding to the microlens 200. In addition, since the microlens 200 corresponds to the ultrasonic element 10 of the ultrasonic element array 10A, the slit 211 is formed corresponding to the ultrasonic element 10.

In the present embodiment, a plurality of slits 211 corresponding to the number of microlenses 200 aligned in the slice direction D1 are formed at distances (pitches) equal to the arrangement distance between the microlenses 200 arranged in the shape of an array. In FIGS. 7 and 8, each slit 211 is formed so as to have a longitudinal length corresponding to the five microlenses 200 aligned in the slice direction D1. In addition, a total of ten slits 211 are formed in the scanning direction D2 at distances (pitches) equal to the arrangement distance between the microlenses 200. The width of each slit 211 in the lateral direction is set to be slightly larger than the beam diameter of ultrasonic waves so that ultrasonic waves emitted by being focused by the microlens 200 can pass therethrough.

In the present embodiment, the slit 211 is formed by laser machining. Specifically, the slit 211 is formed by laser machining using a so-called picosecond laser (short-pulse laser). The picosecond laser is a laser having a pulse width, which indicates the irradiation time of laser, in a picosecond region. Since the irradiation time is short, a region around the machining area is hardly affected by heat, and burrs due to dissolution are hard to occur. Accordingly, it is possible to perform high-density hole machining with high accuracy.

The entire microlens array 200A and the entire backing member 210 are coated with the coating material 250 as described above. In the present embodiment, a silicone resin is used as the coating material 250.

In the silicone resin forming the microlens array 200A, the amount of crosslinking agent is smaller than that in the silicone resin used as the coating material 250. Therefore, the microlens array 200A is configured softer than the coating material 250.

As a coating method, in the present embodiment, the microlens array 200A is first placed in a container as a jig for coating. At this time, the microlens 200 is placed so as to face upward. Then, the backing member 210 is placed on the microlens array 200A. At this time, the backing member 210 is placed such that the slit 211 is located at the center of the microlens 200.

Then, a silicone resin is poured into the container, and the silicone resin is cured in a state in which the entire microlens array 200A and the entire backing member 210 are coated. Accordingly, each microlens 200 and an outer peripheral portion of the microlens array 200A and the inside of the slit 211 and an outer peripheral portion of the backing member 210 are coated, thereby completing the backing unit 20.

The backing unit 20 configured as described above is aligned, and is bonded to the ultrasonic element array 10A with an adhesive layer 50 interposed therebetween. In the present embodiment, a so-called double-sided tape is used as the adhesive layer 50.

Next, the operation of the backing unit 20 with respect to ultrasonic waves will be described.

The ultrasonic wave emitted from the ultrasonic element 10 is transmitted through the silicone resin, which is filled in the opening 12 and has approximately the same acoustic impedance as the ultrasonic element 10, and is transmitted through the adhesive layer 50. The ultrasonic wave transmitted through the adhesive layer 50 is incident on the microlens array 200A of the backing unit 20.

As described above, a silicone resin is used for the microlens array 200A of the backing unit 20, and the acoustic impedance of the silicone resin is approximately the same as the acoustic impedance of the ultrasonic element 10. Therefore, the ultrasonic wave is incident on the inside of the microlens array 200A since the reflection of the ultrasonic wave on the boundary surface of the microlens array 200A is suppressed.

As shown in FIG. 7, ultrasonic waves incident on the microlens array 200A travel through the corresponding microlens 200 to be emitted in a state of being focused by the lens effect. In addition, the ultrasonic waves emitted from the microlens 200 are emitted while suppressing reflection on the boundary surface of the microlens 200 due to the coating material 250 that is formed of a silicone resin harder than the microlens 200.

The ultrasonic waves emitted in a state of being focused from the microlens 200, which has a function as a lens, are transmitted through the coating material 250 to be incident on the corresponding slit 211 of the backing member 210. Since the inside of the slit 211 is filled with the coating material 250, the ultrasonic waves pass through the slit 211 (are transmitted through the filled coating material 250). The ultrasonic waves having passed through the slit 211 are in a state of having been emitted from the backing member 210, and travel toward the end surface of the backing unit 20.

In a case where the end of the backing unit 20 is an air layer, ultrasonic waves reaching the end surface of the backing unit 20 are approximately totally reflected on the end surface that is a boundary surface. Then, the reflected ultrasonic waves travel while being diffused toward the backing member 210. Some of the ultrasonic waves traveling while being diffused are incident on the slit 211, and are transmitted through the microlens 200 to return to the ultrasonic element 10 in a reverse path to that described above. However, the ultrasonic waves transmitted through the slit 211 are ultrasonic waves diffused on the end surface, and the slit 211 also has a width at which the focused ultrasonic waves can pass therethrough. That is, the width of the slit 211 is not large. Accordingly, the ultrasonic waves transmitted through the slit 211 are sufficiently attenuated. As a result, unwanted ultrasonic waves returning to the ultrasonic element are suppressed.

As shown in FIG. 8, the backing member 210 is formed using a rectangular metal member (stainless member), and is connected through the outer peripheral portion except for the slit 211 extending in the slice direction D1. In addition, the backing member 210 has a rigid force required to secure the structural strength for preventing the deflection of the ultrasonic element array 10A or the like.

In addition, the slit 211 is set to have a thickness, at which unnecessary ultrasonic waves can be suppressed, while securing the structural strength (thickness) for preventing the bending of the ultrasonic element array 10A or the like. In other words, the backing unit 20 is set to have a thickness at which the structural strength for preventing the deflection of the ultrasonic element array 10A or the like and the slit 211 capable of suppressing unwanted ultrasonic waves can be secured.

Although a metal member (stainless member) having a thickness of about 10 mm has been used as a backing unit (backing member) in the related art, a metal member (stainless member) having a thickness of about 3 mm to 5 mm can be used as the backing member 210 of the present embodiment.

According to the embodiment described above, the following effects are obtained.

According to the ultrasonic device 1 of the present embodiment, in a case where ultrasonic waves emitted from the second surface (surface opposite to the element forming surface) side of the ultrasonic element 10 are incident on the microlens 200 of the backing unit 20, the ultrasonic waves are emitted in a state of being focused after being transmitted through the microlens 200. The ultrasonic waves that are emitted from the microlens 200 to be focused are transmitted through the slit 211 of the backing member 210. Then, the ultrasonic waves transmitted through the slit 211 travel up to the end surface of the backing unit 20. Here, for example, in a case where the end surface of the backing unit 20 is in contact with an air layer, ultrasonic waves are reflected on the end surface of the backing unit 20 to return in a direction (direction of the slit 211) opposite to the traveling direction until now. However, in a case where the ultrasonic waves are reflected to return in the opposite direction, the ultrasonic waves are diffused. Therefore, the ultrasonic waves passing through the slit 211 again are attenuated. Through the operation described above, it is possible to suppress ultrasonic waves (so-called unwanted ultrasonic waves) returning to the ultrasonic element 10 from the backing unit 20. In addition, compared with the thickness of a backing unit (backing member) in the related art, the backing unit 20 (backing member 210) can be made thin up to the minimum thickness at which the structural strength of the ultrasonic element 10 including the microlens 200 and the slit 211, through which the ultrasonic waves emitted from the microlens 200 pass, can be secured. As a result, it is possible to realize the ultrasonic device 1 that can suppress unwanted ultrasonic waves and can be made thin.

According to the ultrasonic device 1 of the present embodiment, even in a case where the ultrasonic elements 10 are arranged in the shape of an array and the microlenses 200 are arranged in the shape of an array corresponding to the ultrasonic elements 10, it is possible to attenuate ultrasonic waves, which are reflected on the end surface of the backing unit 20 to pass through the slit 211 again, by making ultrasonic waves converge on each of the microlenses 200 and the ultrasonic waves pass through the corresponding slit 211. Therefore, it is possible to suppress unwanted ultrasonic waves. In addition, compared with the thickness of a backing unit (backing member) in the related art, the backing unit 20 (backing member 210) can be made thin up to the minimum thickness at which the structural strength for preventing the deflection of the ultrasonic elements 10 (ultrasonic element array 10A) arranged in the shape of an array, including the microlenses 200 arranged in the shape of an array, and the slit 211, through which the ultrasonic waves emitted from the microlens 200 pass, can be secured. As a result, it is possible to realize the ultrasonic device 1 that can suppress unwanted ultrasonic waves and can be made thin.

According to the ultrasonic device 1 of the present embodiment, ultrasonic waves emitted from the ultrasonic elements 10 can be made to be efficiently incident on the corresponding slits 211 by arranging the slits 211 at distances equal to the arrangement distance between the microlenses 200 arranged in the shape of an array. Therefore, since it is possible to efficiently arrange the slits 211, it is possible to suppress unwanted ultrasonic waves returning to the ultrasonic element 10 from the backing unit 20. As a result, the backing unit 20 can be made thin.

According to the ultrasonic device 1 of the present embodiment, the microlens 200 (microlens array 200A) and the backing member 210 that form the backing unit 20 are coated with the coating material 250. Accordingly, it is possible to prevent the generation of an air layer between the ultrasonic element 10 and the backing unit 20. In a case where a silicone resin is used as the coating material 250, it is possible to approximately match the acoustic impedance of the coating material 250 with the acoustic impedance of the ultrasonic element 10. Therefore, ultrasonic waves emitted from the ultrasonic element 10 can be made to be efficiently incident on the backing unit 20 (microlens array 200A) while suppressing reflection on the boundary surface of the backing unit 20. In addition, in order to prevent the generation of an air layer inside the backing unit 20, focused ultrasonic waves emitted from the microlens 200 are made to be efficiently incident on the slit 211 of the backing member 210 by suppressing the reflection, so that the ultrasonic waves can be transmitted to the back surface side (opposite surface side to the ultrasonic element 10 side) of the backing member 210. Accordingly, unwanted ultrasonic waves transmitted through the backing member 210 are diffused by reflection on the end surface of the backing unit 20, thereby passing through the slit 211 to pass through the microlens 200. Thus, it is possible to suppress unwanted ultrasonic waves returning to the ultrasonic element 10 from the backing unit 20.

Since the ultrasonic probe 100 of the present embodiment is configured such that the thin ultrasonic device 1 is housed in the housing member 80, it is possible to make the ultrasonic probe 100 thin. In addition, since the ultrasonic device 1 for suppressing unwanted ultrasonic waves is housed in the ultrasonic probe 100, it is possible to prevent unwanted ultrasonic waves from riding as noise on the ultrasonic waves emitted toward the subject from the ultrasonic device 1. Therefore, it is possible to improve the quality of the ultrasonic probe 100.

Since the ultrasonic imaging apparatus 110 of the present embodiment includes the thin ultrasonic probe 100, the processing device 101, and the display device 102, it is possible to improve the convenience of the ultrasonic imaging apparatus 110.

In addition, since the ultrasonic imaging apparatus 110 of the present embodiment includes the ultrasonic probe 100 capable of suppressing unwanted ultrasonic waves riding as noise, it is possible to suppress the occurrence and display of artifacts as noise during B-mode imaging. Therefore, the ultrasonic imaging apparatus 110 can generate a clear B-mode image. Thus, it is possible to improve the quality of the ultrasonic imaging apparatus 110. In addition, since the operator uses the ultrasonic imaging apparatus 110 capable of suppressing artifacts in an examination or the like, it is possible to reduce false findings. Accordingly, it is possible to make an accurate diagnosis.

Second Embodiment

Figure 9:
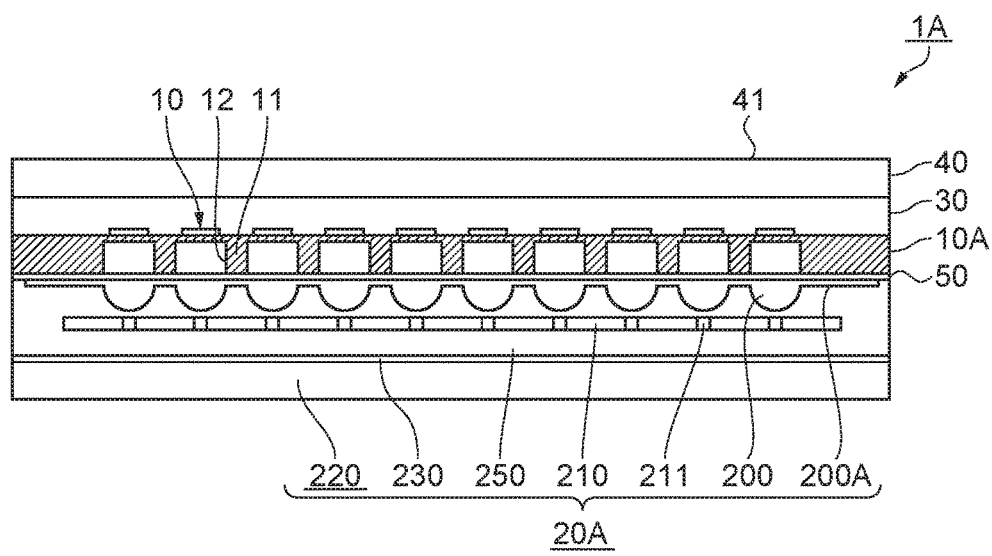
FIG. 9 is a sectional view showing the configuration of an ultrasonic device according to a second embodiment.

FIG. 9 is a sectional view showing the configuration of an ultrasonic device 1A according to a second embodiment. The configuration and operation of the ultrasonic device 1A of the present embodiment will be described with reference to FIG. 9.

In the ultrasonic device 1A of the present embodiment, the configuration of a backing unit 20A is different from that in the ultrasonic device 1 of the first embodiment. The other configuration is the same as the ultrasonic device 1 of the first embodiment. The same components as in the first embodiment are denoted by the same reference numerals.

The backing unit 20A of the present embodiment has a configuration in which a sound absorbing section 220 is added to the backing unit 20 of the first embodiment. Specifically, the backing unit 20A is configured to include a microlens array 200A in which the microlenses 200 are arranged in the shape of an array, the backing member 210 having the slit 211, and the sound absorbing section 220. The microlens array 200A and the backing member 210 are coated with the coating material 250 as in the first embodiment. The backing unit 20A has approximately the same planar size as the backing unit 20 of the first embodiment.

The sound absorbing section 220 is provided in order to absorb ultrasonic waves. In the present embodiment, the sound absorbing section 220 is a rubber sheet formed in a rectangular plate shape. As a rubber sheet, polyurethane rubber is used in the present embodiment. The sound absorbing section 220 is provided so as to be superimposed in the thickness direction of the backing unit 20 of the first embodiment. Specifically, the sound absorbing section 220 is bonded to the outer surface of the backing unit 20A, which is an end surface of the cured coating material 250, with an adhesive layer 230 interposed therebetween. In the present embodiment, a so-called double-sided tape is used as the adhesive layer 230.

Next, the operation of the backing unit 20A with respect to ultrasonic waves will be described. For the explanation of the operation of ultrasonic waves, the following explanation will be given from a point in time at which ultrasonic waves are transmitted through the microlens 200 and are incident on the slit 211 of the backing member 210 to be transmitted therethrough.

The ultrasonic waves transmitted through the slit 211 of the backing member 210 travel to the end surface of the coating material 250. Although some of the ultrasonic waves that have traveled to the end surface of the coating material 250 are reflected, the remaining ultrasonic waves are incident on the sound absorbing section 220 through the adhesive layer 230. Since the ultrasonic waves incident on the sound absorbing section 220 are absorbed into the sound absorbing section 220 due to the characteristics of the sound absorbing section 220, the ultrasonic waves are attenuated. In addition, ultrasonic waves that have not been absorbed by the sound absorbing section 220 are reflected on the end surface to return to the coating material 250 side.

According to the ultrasonic device 1A of the embodiment described above, not only can the same effect as in the ultrasonic device 1 of the first embodiment be obtained, but also the following effects are obtained.

According to the ultrasonic device 1A of the present embodiment, the backing unit 20A includes the sound absorbing section 220 that absorbs ultrasonic waves transmitted through the backing member 210 (slit 211). Through such a configuration, it is possible to further attenuate ultrasonic waves compared with the backing unit 20 in the first embodiment. Accordingly, it is possible to further suppress unwanted ultrasonic waves returning to the ultrasonic element 10 from the backing unit 20A.

The invention is not limited to the embodiments described above, and can be implemented by adding various modifications, improvements, or the like within a range not departing from the spirit of the invention. Modification examples will be described below.

In the ultrasonic device 1 of the first embodiment, the backing unit 20 is formed on the surface (in the present embodiment, the second surface) of the ultrasonic element 10 opposite to the element forming surface. However, without being limited thereto, the backing unit 20 may be formed on the element forming surface. In this case, the element forming surface becomes a second surface. This is the same in the second embodiment.

In the ultrasonic device 1 of the first embodiment, one slit 211 of the backing unit 20 (backing member 210) is formed for all of the ultrasonic elements 10 formed in the slice direction D1. However, without being limited thereto, a plurality of slits 211 may be formed corresponding to the number of ultrasonic elements 10 formed in the slice direction D1. This is the same in the second embodiment.

In the ultrasonic device 1 of the first embodiment, the slit 211 of the backing unit 20 (backing member 210) is formed so as to extend in the slice direction D1. However, without being limited thereto, the slit 211 may be formed so as to extend in the scan direction D2. This is the same in the second embodiment.

In the ultrasonic device 1 of the first embodiment, the slit 211 of the backing unit 20 (backing member 210) is formed so as to extend in the slice direction D1. However, without being limited thereto, the slit 211 formed so as to extend in the scan direction D2 or the slice direction D1 may be provided together in one backing member 210. This is the same in the second embodiment.

In the ultrasonic device 1 of the first embodiment, the microlens 200 or the slit 211 is provided corresponding to the ultrasonic element 10 of the ultrasonic element array 10A. In the ultrasonic element array 10A, however, in a case where the ultrasonic element 10 located on the outer peripheral side is a dummy ultrasonic element, neither the microlens 200 nor the slit 211 may be provided for the dummy ultrasonic element 10. This is the same in the second embodiment.

In the ultrasonic device 1A of the second embodiment, polyurethane rubber is used as the sound absorbing section 220. However, resin-based rubber or the like may be used without being limited thereto. In addition, rubber filled with ferrite powder may be used, or polyvinyl chloride or epoxy resin in which tungsten powder is dispersed may be used. In addition, a material obtained by combining felt, glass wool, or the like with the resin may also be used.

In the ultrasonic device 1 of the first embodiment, the microlens array 200A and the coating material 250 are formed using the same silicone resin. However, without being limited thereto, the microlens array 200A may be formed using a silicone resin, and a synthetic resin, such as an ABS resin, may be used as the coating material 250. This is the same in the second embodiment.

What is claimed is:

1. An ultrasonic device that transmits and receives ultrasonic waves, comprising:
   ultrasonic elements having first and second surfaces from which the ultrasonic waves are emitted; and
   a backing unit that supports the second surfaces of the ultrasonic elements and attenuates the ultrasonic waves emitted to the second surface side,
   wherein the backing unit includes microlenses, which are arranged on the second surface side of the ultrasonic elements so as to be located corresponding to the ultrasonic elements, and a backing member having slits through which the ultrasonic waves transmitted through the microlenses pass.

2. The ultrasonic device according to claim 1,
   wherein the ultrasonic elements are arranged in a shape of an array, and
   the microlenses are arranged in a shape of an array corresponding to the ultrasonic elements.

3. The ultrasonic device according to claim 2,
   wherein the slits are arranged at distances equal to an arrangement distance between the microlenses arranged in the shape of an array.

4. The ultrasonic device according to claim 1,
   wherein the microlenses and the backing member are coated with a coating material.

5. The ultrasonic device according to claim 1,
   wherein the backing unit includes a sound absorbing section that absorbs the ultrasonic waves transmitted through the backing member.

6. An ultrasonic probe comprising:
   the ultrasonic device according to claim 1; and
   a housing member that houses the ultrasonic device such that a part of the ultrasonic device is exposed.

7. An ultrasonic probe comprising:
   the ultrasonic device according to claim 2; and
   a housing member that houses the ultrasonic device such that a part of the ultrasonic device is exposed.

8. An ultrasonic probe comprising:
   the ultrasonic device according to claim 3; and
   a housing member that houses the ultrasonic device such that a part of the ultrasonic device is exposed.

9. An ultrasonic probe comprising:
   the ultrasonic device according to claim 5; and
   a housing member that houses the ultrasonic device such that a part of the ultrasonic device is exposed.

10. An ultrasonic probe comprising:
    the ultrasonic device according to claim 6; and
    a housing member that houses the ultrasonic device such that a part of the ultrasonic device is exposed.

11. An electronic apparatus comprising:
    the ultrasonic probe according to claim 6; and
    a processing device that controls the ultrasonic probe and processes an input signal from the ultrasonic probe.

12. An electronic apparatus comprising:
    the ultrasonic probe according to claim 7; and
    a processing device that controls the ultrasonic probe and processes an input signal from the ultrasonic probe.

13. An electronic apparatus comprising:
    the ultrasonic probe according to claim 8; and
    a processing device that controls the ultrasonic probe and processes an input signal from the ultrasonic probe.

14. An electronic apparatus comprising:
    the ultrasonic probe according to claim 9; and
    a processing device that controls the ultrasonic probe and processes an input signal from the ultrasonic probe.

15. An electronic apparatus comprising:
    the ultrasonic probe according to claim 10; and
    a processing device that controls the ultrasonic probe and processes an input signal from the ultrasonic probe.

16. An ultrasonic imaging apparatus comprising:
    the ultrasonic probe according to claim 6;
    a processing device that controls the ultrasonic probe and generates an image by processing an input signal from the ultrasonic probe; and
    a display device that displays the image generated by the processing device.

17. An ultrasonic imaging apparatus comprising:
    the ultrasonic probe according to claim 7;
    a processing device that controls the ultrasonic probe and generates an image by processing an input signal from the ultrasonic probe; and
    a display device that displays the image generated by the processing device.

18. An ultrasonic imaging apparatus comprising:
    the ultrasonic probe according to claim 8;
    a processing device that controls the ultrasonic probe and generates an image by processing an input signal from the ultrasonic probe; and
    a display device that displays the image generated by the processing device.

19. An ultrasonic imaging apparatus comprising:
    the ultrasonic probe according to claim 9;
    a processing device that controls the ultrasonic probe and generates an image by processing an input signal from the ultrasonic probe; and a display device that displays the image generated by the processing device.

20. An ultrasonic imaging apparatus comprising:
the ultrasonic probe according to claim 10;
a processing device that controls the ultrasonic probe and generates an image by processing an input signal from the ultrasonic probe; and
a display device that displays the image generated by the processing device.

\* \* \* \* \*